United States Patent
Faust

[15] 3,669,894
[45] June 13, 1972

[54] PREPARATION OF HIGH TEST CALCIUM HYPOCHLORITE

[72] Inventor: John P. Faust, Hamden, Conn.
[73] Assignee: Olin Corporation
[22] Filed: Sept. 2, 1970
[21] Appl. No.: 69,130

[52] U.S. Cl. .................................. 252/187, 23/86, 252/99
[51] Int. Cl. ....................................................... C01b 11/06
[58] Field of Search .................. 252/187, 99, 94; 23/86, 152

[56] References Cited

UNITED STATES PATENTS 3,544,267  12/1970  Dychdala ................................. 23/86
3,584,996  6/1971  Hughes ................................. 252/187

Primary Examiner—Leon D. Rosdol
Assistant Examiner—Irwin Gluck
Attorney—Gordon D. Byrkit, Donald F. Clements, Thomas P. O'Day, F. A. Iskander and Eugene Zagarella, Jr.

[57] ABSTRACT

Calcium hypochlorite compositions, suitable for bleaching and sanitation uses, are provided which have lowered rates of propagation of decomposition when heated. These novel compositions contain 75 to 82 percent of calcium hypochlorite and 6 to 12 percent of water, balance usual diluents of calcium hypochlorite including calcium chloride, carbonate, hydroxide and sodium chloride.

3 Claims, No Drawings

PREPARATION OF HIGH TEST CALCIUM HYPOCHLORITE

This invention relates to novel calcium hypochlorite compositions and the method of making them. In one aspect, the invention relates to solid compositions containing 75 to 82 percent of calcium hypochlorite and 6 to 12 percent of water. Other diluents normally present in solid calcium hypochlorite are also suitably present in the calcium hypochlorite compositions. These novel compositions are designed and have the advantage, over calcium hypochlorite compositions previously known to the art, of having a substantially slower rate of decomposition when accidentally contacted by organic or other readily oxidizable materials or by heat or fire.

Calcium hypochlorite is a well known dry chemical and it has been made and sold commercially for many years. It is used as a source of "dry chlorine" for sanitation purposes, for example, in disinfecting the water of swimming pools. The maintenance of a small residual of "available chlorine" suitably from about 0.5 to 1 part per million parts of water is sufficient to insure prompt destruction of bacterial contamination, so that the water is safe to swim in.

With widespread installation of swimming pools and resulting expansion of sales of calcium hypochlorite to the general public rather than primarily to other chemical manufacturers, municipal and other large scale users, this vigorously reactive chemical has been placed in the hands of many who are unskilled in its use and unfamiliar with the hazards possibly resulting should it be involved in a fire. As a result, frequently of ignorance or carelessness, fires involving calcium hypochlorite have occurred which endangered life and property. It is essential to provide a calcium hypochlorite product having a reduced rate of decomposition even when misused or carelessly handled but which still retains high test and effectiveness sufficient for sanitation purposes.

In a number of instances, serious fires have resulted when a solid hypochlorite has been contacted by a lighted cigarette. While dropping of a lighted cigarette into a commercial preparation of calcium hypochlorite is not a common occurrence, it does happen. Probably for each million of 100 pound drums of calcium hypochlorite sold, one will have a lighted cigarette dropped in it; it is unlikely that the probability will be greater than one for each half million drums sold. The directions given with the product always warn against such a possibility and against other forms of contamination. To avoid this hazard, attempts have been made to safen calcium hypochlorite, especially against the hazard of contact with a lighted cigarette.

Various diluents have been proposed for use with solid hypochlorite for various purposes, including stabilization (e.g., $Na_2O$, in U.S. Pat. No. 1,961,576), detergent effects (e.g., U.S. Pat. Nos. 2,320,279–80), sequestering calcium (e.g., U.S. Pat. Nos. 2,166,362–3; 2,959,554) and for other purposes. However, because of the chemical reactivity of the hypochlorites, the choice of diluents is severely limited. Many proposed diluents deleteriously affect the stability of hypochlorites and cause them to lose available chlorine rapidly. Especially at elevated temperatures, many proposed diluents cause rapid decomposition in contact with hypochlorites.

In the early commercialization of calcium hypochlorite, calcium hydroxide was a common diluent. Many of the processes employed for the preparation of calcium hypochlorite tended to leave calcium hydroxide in the product. Another common diluent was sodium chloride, a naturally formed diluent in the processes used by the Mathieson Alkali Works, Inc., who introduced "HTH" brand of calcium hypochlorite in 1928.

The first products put out were advertised to contain 65 percent calcium hypochlorite. However, because buyers have a natural reluctance to pay for diluents, the product was raised to contain 70 percent or more of calcium hypochlorite. Purchasers continued to press for higher tests and by 1935 the Mathieson Alkali Works was shipping carload lots of product containing 80 percent of more of calcium hypochlorite.

When several drums of "HTH" containing over 80 percent of calcium hypochlorite became involved in fires, shipments of 80 percent and higher material were discontinued and commercial production of calcium hypochlorite has remained at about 70 percent of over 30 years.

Further work to safen calcium hypochlorite compositions has led to a process in which most of the sodium chloride formed in the manufacturing process is removed prior to drying the calcium hypochlorite product and is replaced by sodium nitrate prior to drying. Later, higher test calcium hypochlorite preparations (80 to 85 percent available chlorine) were made by known methods and these were diluted to 72 to 74 percent calcium hypochlorite content by addition of crystalline sodium nitrate. In a still more recent development, described in U.S. Pat. No. 3,560,396, calcium hypochlorite is advantageously diluted with spray-formed sodium nitrate.

In another recent development, described in German Offenlegungschrift 1,944,097, a measured amount of water is uniformly added to an essentially dry, dust-containing commercial calcium hypochlorite product, until the water content reaches about 4 to 15 percent. The calcium hypochlorite preparation thus produced is a free-flowing granulate which is less susceptible to decomposition, free from dust and has a particle size of about 0.075 to 2 mm. The water addition produces an exothermic reaction and the temperature of the mixture is kept below 66° C. by cooling. A preferred method of water addition is by spraying the stirred mass. The resulting product contains 4 to 15 percent of water and, starting with a commercial 70 percent calcium hypochlorite material, the final product contains from 59 to 67 percent calcium hypochlorite. It is considerably "safened" with respect to ignition and exothermic decomposition.

One object of this invention is to provide high test calcium hypochlorite compositions which are safened with respect to decomposition rates but without addition of inorganic salt diluent.

Another object of the present invention is to provide compositions having materially lowered rates of propagation of decomposition while maintaining high available chlorine content compared with any compositions of the prior art.

Another object of the present invention is to provide an improved method of preparing the safened compositions of this invention.

Other objects of this invention appear elsewhere in this specification.

In one aspect, the present invention provides calcium hypochlorite compositions containing 75 to 82 percent of $Ca(OCl)_2$, 6 to 12 percent of water, balance minor amounts of constituents normally present in calcium hypochlorite preparations.

The starting material for the purposes of the present invention is a solid, dry calcium hypochlorite composition containing 85 to 90 percent of calcium hypochlorite and under 5 percent of water, balance inert materials usually associated therewith resulting from the process of manufacture, e.g., sodium chloride, calcium hydroxide, chloride and carbonate. In a heretofore customary practice of calcium hypochlorite manufacture, the calcium hypochlorite is obtained as a slurry containing crystals of calcium hypochlorite dihydrate [$Ca(OCl)_2 \cdot 2H_2O$] in a mother liquor consisting essentially of an aqueous solution of calcium hypochlorite and sodium chloride. The slurry is filtered on a rotary vacuum filter to produce a cake that retains sufficient mother liquor to have a moisture content of 45 percent to 50 percent by weight. The wet cake, e.g., from an Eimco filter, when dried directly yields the calcium hypochlorite of commerce. However, when such a wet cake is further processed, e.g., by filtration, centrifuging or otherwise to separate further quantities of liquor, a wet solid is obtained which on drying produces the 85 to 90 percent calcium hypochlorite used as a starting material according to this invention.

In the process of this invention a calcium hypochlorite containing 85 to 90 percent calcium hypochlorite is exposed to an inert gas, e.g., air or nitrogen, having a humidity of 80 to 100 percent at temperatures of 80° to 110° F. for a time sufficient to form a hypochlorite product containing 6 to 12 percent water. The granular (0.05 to 3 mm.) calcium hypochlorite product contains from 75 to about 82 percent calcium hypochlorite. It is not only "safened" with respect to ignition and exothermic decomposition but also is marketable as a guaranteed 70 percent calcium hypochlorite having a suitable margin for loss during shelf storage.

EXAMPLE I

A sample of Eimco filter cake containing 39.42 percent calcium hypochlorite and 48.8 percent water was taken from an operation producing commercial 70 percent calcium hypochlorite. It was further pressed in a porous bag to reduce the water content and then dried in a vacuum oven. The resulting dried material contained 86 percent calcium hypochlorite and 1 percent water. The dried material was exposed to air at 100° F. having 90 percent relative humidity for 1 hour. It then contained 76.24 percent calcium hypochlorite and 11.28 percent water. When a lighted cigarette was laid on the product, it produced no self-sustaining reaction although the 86 percent material reacted vigorously in a self-sustaining reaction until all of that product was decomposed.

EXAMPLE II

Calcium hypochlorite filter cake from a commercial operation for preparing 70 percent calcium hypochlorite and containing about 25 percent water was vacuum dried to 4.65 percent water and 85.3 percent calcium hypochlorite. This starting material was reactive toward lighted cigarettes and burning matches.

Part of the above-described starting material was placed in a desiccator, the bottom of which contained water at 104° F. The desiccator was flushed thoroughly with nitrogen to remove all the air. The product remained in the atmosphere of wet nitrogen for 20 minutes. A portion was removed and found to be unreactive toward lighted cigarettes and matches. The product was found to contain 82 percent calcium hypochlorite and 9.3 percent water.

EXAMPLE III

Another portion of the starting material described in Example II was exposed to air at 100° F. having 90 percent relative humidity for 10 minutes. A sample was found to be unreactive toward lighted cigarettes and matches. It contained 10.4 percent water and 80.85 percent calcium hypochlorite.

What is claimed is:

1. Method of preparing a granular calcium hypochlorite composition containing 75 to 82 percent of calcium hypochlorite, 6 to 12 percent of water, balance sodium chloride and minor amounts of constituents normally present in calcium hypochlorite by exposing granular calcium hypochlorite containing 85 to 90 percent calcium hypochlorite to a gas selected from the group consisting of air and nitrogen and having a humidity of 80 to 100 percent at temperatures from 80° to 110° F. for a time sufficient to produce a calcium hypochlorite product containing from 6 to 12 percent of water and from 75 to 82 percent of calcium hypochlorite.

2. Method as claimed in claim 1 in which said inert gas is air.

3. Method as claimed in claim 1 in which said inert gas is nitrogen.

* * * * *